Patented Sept. 13, 1932

1,877,178

UNITED STATES PATENT OFFICE

ERNST HONOLD, OF FRANKFORT-ON-THE-MAIN-FECHENHEIM, GERMANY, ASSIGNOR TO GENERAL ANILINE WORKS, INC., OF NEW YORK, N. Y., A CORPORATION OF DELAWARE

VAT DYESTUFFS OF THE BENZANTHRONE SERIES AND PROCESS OF MAKING SAME

No Drawing. Application filed February 28, 1929, Serial No. 343,566, and in Germany March 2, 1928.

The present invention relates to vat dyestuffs of the benzanthrone series and to a process of making the same.

I have found that valuable vat dyestuffs are obtained by acting with an excess of a nitrating agent on a 2.2'-dibenzanthronyl compound which may contain halogen atoms and treating the products, thus formed, with alkalies and with alkaline reducing agents. The first step of my process is advantageously carried out at a lower temperature. Thereby nitro and hydroxy groups are probably introduced into the molecule of the starting material. For carrying out the second step advantageously the raw products may be treated with alkali metal sulfides. In the second phase an inner condensation occurs and simultaneously the reduction of the nitro groups, contained in the molecule. This effect can be obtained also by vatting the dyestuffs. The dyestuffs, thus obtained, the constitution of which is undetermined as yet may be alkylated, forming thereby vat dyestuffs of an increased fastness.

In order to further illustrate my invention the following examples are given, the parts being by weight and all temperatures in centigrade degrees; but I wish to be understood that my invention is not limited to the examples given, nor to the exact conditions stated therein.

Example 1

90 parts of 2.2'-dibenzanthronyl are introduced at 5–10°, while stirring, into 600 parts of nitric acid of 48° Bé. The dark red solution is allowed to stand at 20° for 3 hours and is then diluted with water. The precipitated product is filtered off and washed. It dissolves in sulfuric acid with a brown tint. It is partially soluble in dilute caustic alkali solutions to brownish violet solutions and yields with a caustic soda solution and hydrosulfite a dark violet vat dyeing cotton grey shades.

100 parts of this product, 500 parts of water, 500 parts of alcohol and 100 parts of caustic soda solution of 33° Bé. are boiled together under a reflux condenser for 3 hours. In this manner a black powder is obtained. The dyestuff, thus purified, dissolves in sulfuric acid to a dark violet solution and dyes cotton from a dark brown vat greyish green shades of a good fastness. By treating this dyestuff with an alkylating agent, e. g. with toluene sulfonic acid ethyl ester, a new product is obtained soluble in sulfuric acid to a reddish violet solution and dyeing cotton from a blue vat (showing a red fluorescence) greenish grey shades of an excellent fastness.

Example 2

45 parts of 2.2'-dibenzanthronyl are dissolved in 800 parts of sulfuric acid and into this solution 100 parts of a mixture of sulfuric and nitric acid are allowed to run at 10–20°, while stirring. After 4 hours the mass is poured on ice and the dyestuff is isolated as described in Example 1.

Instead of sulfuric acid other solvents, such as nitrobenzene or glacial acetic acid may be employed.

100 parts of the raw dyestuff, thus obtained, are boiled with a solution of 800 parts of crystallized sodium sulfide in 3000 parts of water under a reflux condenser for several hours. By filtering and washing a greyish black product is obtained. The dyestuff, thus purified, dissolves in sulfuric acid with a violetish brown tint and dyes cotton from a bluish violet vat dark olive grey shades of an excellent fastness especially to light.

The same dyestuff is obtained by vatting the raw dyestuff and isolating it by means of air.

Example 3

62 parts of dibromo-dibenzanthronyl (obtained by introducing 2.2'-dibenzanthronyl into an excess of bromine) are introduced into 600 parts of nitric acid of 48° Bé., the temperature being kept below 10° by cooling. The mass is allowed to stand at room temperature for several hours. Then the dyestuff is precipitated by the addition of water and washed. It is mixed advantageously in the form of a moist paste with a solution containing sodium hydroxide and the tenfold quantity of water and of alcohol. The mixture is stirred at 80–100° for some time, then it is filtered and the residue is washed. The dyestuff, thus formed, dissolves in sulfuric acid to a dark violet solution and dyes cotton from a blue vat greenish grey shades of an excellent fastness.

I claim:

1. A process for the manufacture of vat dyestuffs of the benzanthrone series which comprises nitrating a 2.2'-dibenzanthronyl compound which may contain halogen atoms with an excess of nitrating agent at between about 5° C. and about 20° C. and then heating the vattable product, thus obtained, with a compound of the group consisting of alkali metal sulfides and caustic alkali.

2. A process for the manufacture of vat dyestuffs of the benzanthrone series which comprises nitrating a 2.2'-dibenzanthronyl compound which may contain halogen atoms with an excess of nitrating agent at between about 5° and about 20° C. and then heating the vattable product, thus obtained, with an aqueous solution containing a compound of the group consisting of sodium sulfide and sodium hydroxide at between about 80° C. and about the boiling point of said aqueous solution.

3. A process for the manufacture of a vat dyestuff of the benzanthrone series which comprises nitrating 2.2'-dibenzanthronyl with an excess of nitrating agent at a temperature between about 5° and 20° C. and then boiling the vattable product, thus obtained, with an aqueous solution of sodium sulfide.

4. As new products, vat dyestuffs of the benzanthrone series obtainable in accordance with claim 1 which dyestuffs are, when dry, dark colored powders, soluble in sulfuric acid with a violet tint, dyeing cotton greenish to grey shades of an excellent fastness, capable of being alkylated and yielding thereupon dyestuffs of similar properties.

5. As a new product, the vat dyestuff of the benzanthrone series obtainable in accordance with claim 3 which dyestuff is, when dry, a greyish-black powder, soluble in sulfuric acid, to a brownish-violet solution, dyeing cotton dark olive grey shades of excellent fastness particularly to light, capable of being alkylated and yielding thereupon a dyestuff of similar properties.

In testimony whereof, I affix my signature.

ERNST HONOLD.